United States Patent
Chazot

[19]
[11] Patent Number: 5,809,830
[45] Date of Patent: Sep. 22, 1998

[54] CONTROL DEVICE, ESPECIALLY FOR A MOTOR VEHICLE CLUTCH

[75] Inventor: Frank Chazot, Margency, France

[73] Assignee: Valeo, Creteil, France

[21] Appl. No.: 602,730

[22] PCT Filed: Jun. 20, 1995

[86] PCT No.: PCT/FR95/00821

§ 371 Date: Feb. 20, 1996

§ 102(e) Date: Feb. 20, 1996

[87] PCT Pub. No.: WO95/35452

PCT Pub. Date: Dec. 28, 1995

[30] Foreign Application Priority Data

Jun. 20, 1994 [FR] France .................................... 94 07518

[51] Int. Cl.$^6$ .............................. F16D 28/00; F16D 29/00
[52] U.S. Cl. ...................... 74/89.15; 74/100.1; 192/84.6; 192/90; 192/91 R
[58] Field of Search .......................... 192/84.6, 90, 91 R, 192/85 R, 85 C; 74/89.15, 100.1; 188/162, 156

[56] References Cited

U.S. PATENT DOCUMENTS

| | | | |
|---|---|---|---|
| 4,202,430 | 5/1980 | Stevens | 188/162 X |
| 4,591,034 | 5/1986 | Tellert et al. | 192/84.6 X |
| 4,671,400 | 6/1987 | Grunberg et al. | |
| 4,729,544 | 3/1988 | Baumann | 74/89.15 X |
| 4,828,093 | 5/1989 | Bertin et al. | 192/90 |
| 4,852,419 | 8/1989 | Kittel et al. | 74/89.14 |
| 4,878,396 | 11/1989 | Grunberg | |
| 5,094,079 | 3/1992 | Leigh-Monstevens et al. | 192/83 X |

FOREIGN PATENT DOCUMENTS

| | | |
|---|---|---|
| 2523723 | 9/1983 | France . |
| 2541793 | 8/1984 | France . |
| 2564220 | 11/1985 | France . |
| 2611615 | 9/1988 | France . |
| 2614661 | 11/1988 | France . |

*Primary Examiner*—Rodney H. Bonck
*Attorney, Agent, or Firm*—Longacre & White

[57] ABSTRACT

A control device including an electric motor (11), which acts through a transmission (12) on a piston (13) of an actuator (14), a resilient assistor (15) which acts on a member (16) of the transmission (12), and a compensator (17) which provides controlled modulation of the action of the resilient assistor (15) on the member (16). The compensator (17) has at least one train of rollers (37), which are mounted for rotation about a fixed axis (A2) which includes, spaced away from the latter, a roller (38A) making contact with a plate (39A) which is fixed to the member (16) of the transmission (12), and a roller (38B) making contact with a plate (39) on which the resilient assistor (15) bears, and which is moveable axially with respect to the plate.

12 Claims, 2 Drawing Sheets

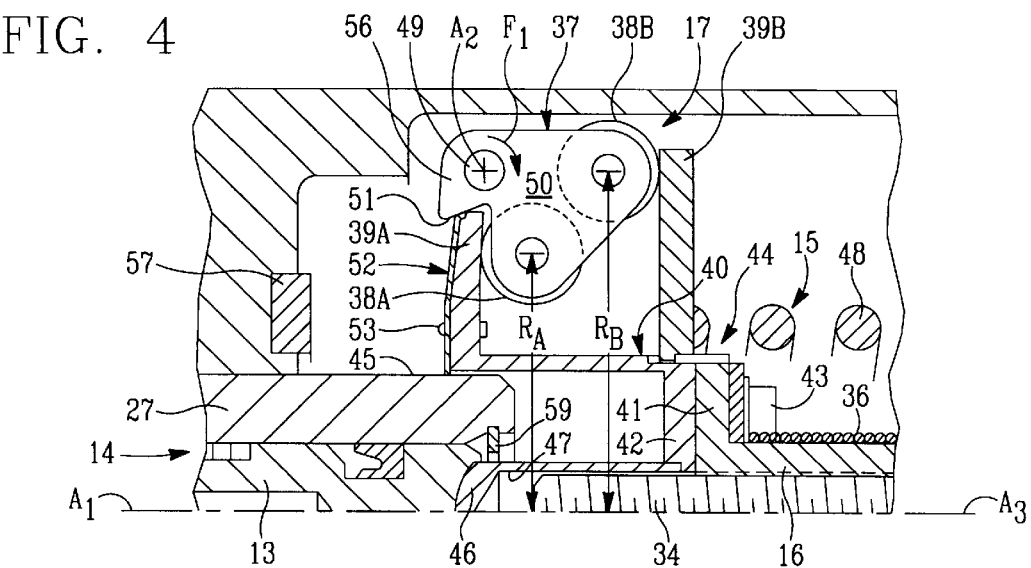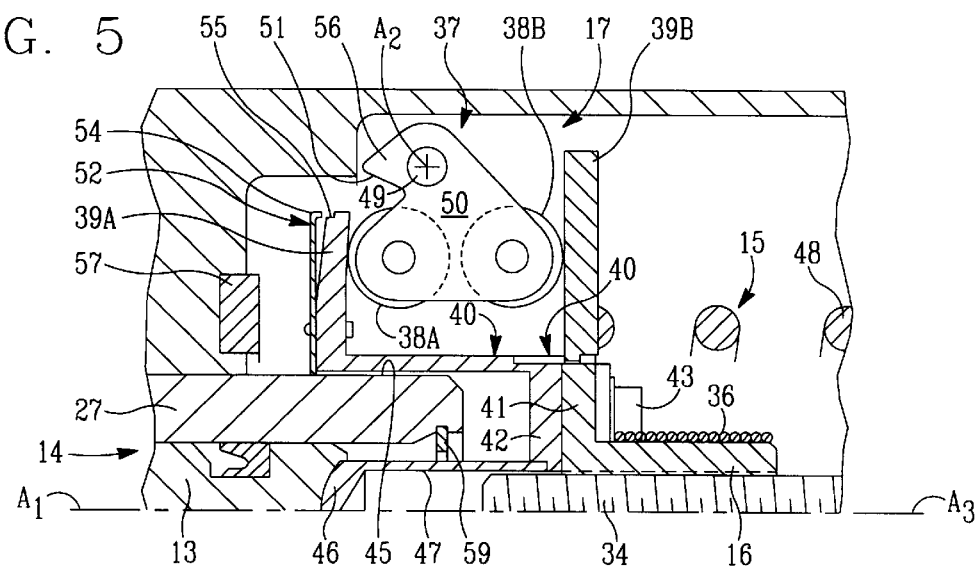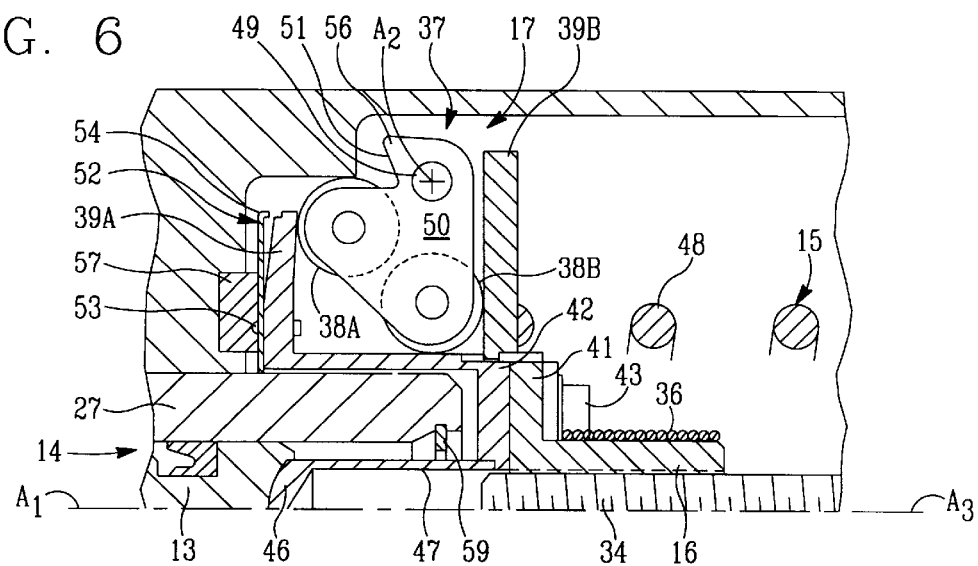

CONTROL DEVICE, ESPECIALLY FOR A MOTOR VEHICLE CLUTCH

BACKGROUND OF THE INVENTION

1. Field of the Invention

This invention relates generally to control devices of the kind comprising an electric motor which acts through a transmission on an output element, resilient assisting means which act in parallel with the electric motor on one of the members that constitute the transmission, and mechanical compensating means which provide controlled modulation of the action of the resilient assisting means on the said member of the transmission. These control devices are applicable especially for the control of the clutch of a motor vehicle, as is described for example in the documents FR-A-2 523 743, 2 564 920 and 2 541 793 (U.S. Pat. Nos. 4,878,396, 4,671,400).

2. Description of the Prior Art

During an operation of controlling the disengagement of such a clutch, the electric motor, through the interposed transmission and output element, ensures the suitable positioning of the clutch release bearing, with the output element working accordingly, for example, on the declutching force conventionally associated with the latter, while under the control of the mechanical compensating means, the resilient assisting means develop the axial force necessary for balancing the reaction force which is due to the diaphragm of the clutch.

Thanks to the said resilient assisting means, it is possible, with advantage, to fulfil the requirements of the system with a relatively low power electric motor.

At the same time, the mechanical compensating means have the advantage of enabling the said resilient assisting means to be matched to the inherent characteristics of the diaphragm.

The invention is directed more particularly to the case where the output element is a hydraulic actuator, which has the advantage of enabling the forces due to the inevitable wear in the friction liners of the friction disc of the clutch, and the forces on the piston on which the electric motor works through the transmission, as is the case for example in the documents FR-A-2 611 615 and 2 614 661, to be absorbed more easily.

In those documents, the transmission comprises two members, namely a worm which is mounted in rotation on the output shaft of the electric motor, and a toothed wheel, which engages tangentially with the worm and to which a thrust member, acting on the piston of the hydraulic actuator, is articulated in the manner of a crank, while at the same time the mechanical compensating means result from the fact that the resilient assisting means act at one point on the said toothed wheel, which is offset angularly from the point at which the said thrust member is articulated to it.

Having regard to the fact that the said transmission must also afford a certain reduction ratio, the toothed wheel inevitably has a relatively large diameter, to the detriment of the overall size of the assembly and such as to make it difficult to fit within a crowded environment.

An object of the invention is to provide a control device of the kind concerned which can advantageously be made in a reduced size, and which also has other advantages.

SUMMARY OF THE INVENTION

This control device is characterised in that, its output element being defined by a hydraulic actuator, on the piston of which the electric motor acts through an interposed transmission, the mechanical compensating means include at least one train of rollers, which are mounted for rotation about a fixed axis orthogonal to the axis of the hydraulic actuator and which comprise, spaced away from the said fixed axis, at least two rollers, namely a first roller making contact with a first plate, which is coupled to the said member of the transmission for movement therewith and which is movable axially between two positions, one retracted and one deployed, and a second roller making contact with a second plate, on which the resilient assisting means bear, and which, while being rotatable with the first plate, is mounted for axial movement with respect to the latter.

The control device constructed in this way can be advantageously made in a relatively reduced size, in both the axial and transverse dimensions. This is all the more so since its main components, namely the electric motor, the spring which in practice constitutes the resilient assisting means, and the hydraulic actuator, can be arranged to advantage on a common axis.

The transmission, interposed between the electric motor and the piston of the hydraulic actuator, preferably comprises two members in screw-and-nut relationship with respect to each other, which is another factor in favour of a reduction in the size of the assembly, both in the axial and transverse dimensions.

In addition, by virtue of the use of rollers in the transmission, friction effects are reduced, which is beneficial to output.

In addition, the number of components used in the assembly is itself reduced, which is an advantage.

Finally, the advantage can be obtained that the hydraulic part and the mechanical part of the control device are well dissociated from each other.

In this regard, the control device in accordance with the invention preferably comprises, separately from each other, firstly a mechanical sub-assembly, which comprises the electric motor, the transmission, the resilient assisting means and the mechanical compensating means, and secondly, a hydraulic sub-assembly which is attached on the mechanical sub-assembly and which comprises the hydraulic actuator.

Preferably again, the body of the hydraulic actuator is engaged axially in the mechanical sub-assembly, and, apart from the fact that this results in yet a further reduction in the axial size of the assembly, the body of the said hydraulic actuator can then with advantage constitute, if desired, a cylindrical guide surface for the first plate of the mechanical compensating means, which benefits the working conditions of these latter.

In a modified embodiment, the said first plate can also be guided by bars appropriately provided for this purpose.

The features and advantages of the invention will appear more clearly from the following description, given by way of example and with reference to the attached diagrammatic drawings, in which:

BRIEF DESCRIPTION OF THE DRAWINGS

FIG. 4 repeats on a larger scale the detail of FIG. 1 shown in the box IV in FIG. 1, for the initial retracted position of the first plate which is comprised in the mechanical compensating means of the control device in accordance with the invention;

FIG. 5 is a view similar to FIG. 4, for an intermediate position of the said first plate between its initial retracted position and its final deployed position;

FIG. 6 is a view similar to those of FIGS. 4 and 5, showing the final deployed position of the said first plate;

DETAILED DESCRIPTION OF THE PREFERRED EMBODIMENT

Figure 1:
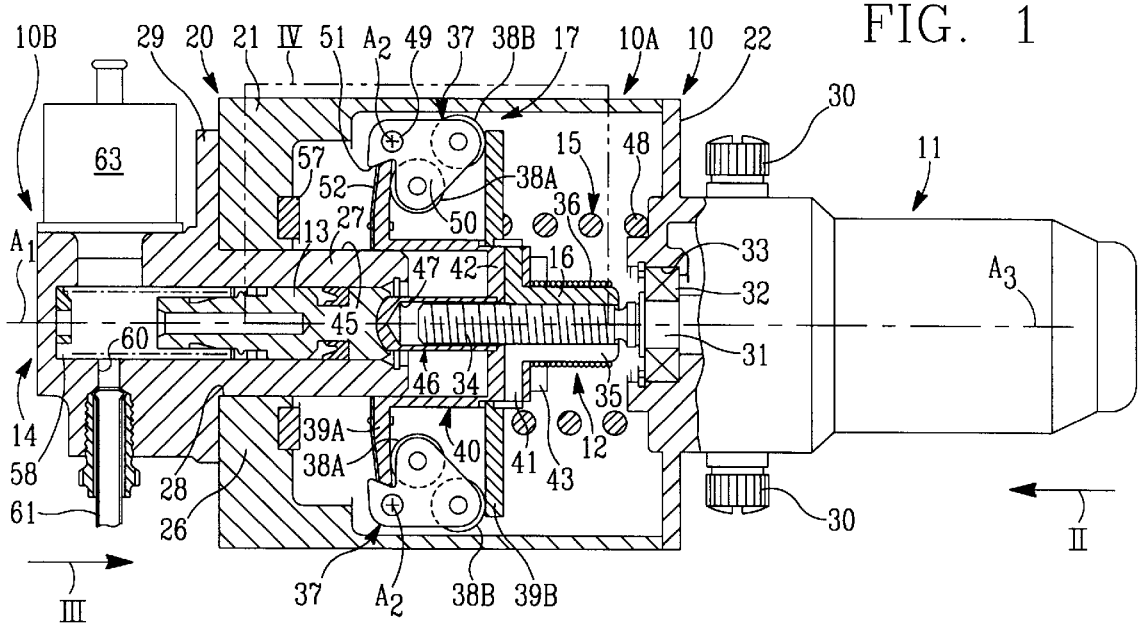
FIG. 1 is a view, partly in axial cross section and partly in elevation, of a control device in accordance with the invention.
Figure 2:
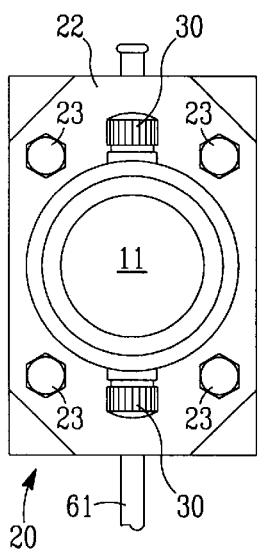
FIG. 2 is an end view of the same control device, seen in the direction of the arrow II in FIG. 1.
Figure 3:
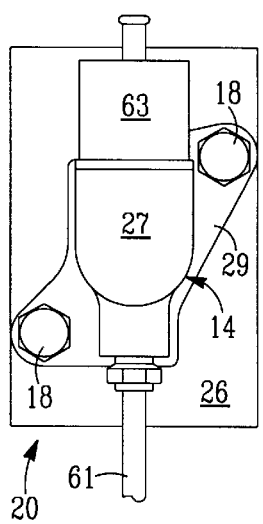
FIG. 3 is an end view of the same, from the opposite side to the foregoing and in the direction of the arrow III in FIG. 1.

As is shown in the drawings, the control device 10 in accordance with the invention comprises, generally, an electric motor 11 which acts, through a transmission 12 which in this example is mechanical, on the piston 13 of a hydraulic actuator 14 which constitutes an output element for the assembly as a whole, resilient assisting means 15 which act, in a manner to be explained later herein, in parallel with the electric motor 11 on one, 16, of the members constituting the transmission 12, together with mechanical compensating means 17 which provide controlled modulation for the action of the resilient assisting means 15 on the said member 16.

In the present case, the control device 10 in accordance with the invention comprises, separately, firstly a mechanical sub-assembly 10A that includes the electric motor 11, the transmission 12, the resilient assisting means 15 and the mechanical compensating means 17, and secondly a hydraulic sub-assembly 10B which is attached on the mechanical sub-assembly 10A, in this example by means of two studs 18, and which comprises the hydraulic actuator 14.

In the present case the mechanical sub-assembly 10A comprises a casing 20, the shape of which is generally that of a parallelepiped, with its body 21 containing the transmission 12, the resilient assistance means 15 and the mechanical compensating means 17, while the cover plate 22 of the casing 20, fixed on to the body 21 by means of studs 23, carries externally the casing of the electric motor 11, which in the present case is integral with it.

In this example the hydraulic sub-assembly 10B is arranged on the same side of the casing 20 as the base portion 26 of the body 21, and therefore on the side which is remote from the electric motor 11.

The body 27 of the hydraulic actuator 14 is in this example at least partly engaged axially in the mechanical sub-assembly 10A, via an aperture 28 which is provided for this purpose in the base portion 26 of the body 21 of the casing 20, in the middle zone of the said base portion 26.

The body 27 of the hydraulic actuator 14 is abutted on the base portion 26 of the body 21 of the casing 20, by means of a flange 29 which extends transversely about halfway along its length, with the studs 18 passing through this flange.

The electric motor 11 is supplied with electrical power through connecting terminals 30.

In this example, the shaft 31 of the electric motor 11 passes, with a ball bearing 32 being interposed, through the cover plate 22 of the casing 20 via an aperture 33 which is provided for this purpose in the said cover plate 22 in the middle zone of the latter, and it extends along the axis A1 of the hydraulic actuator 14, that is to say in the direction in which the piston 13 of the latter is displaced.

In the present case, the transmission 12 includes two members arranged in screw-and-nut relationship with respect to each other, namely, firstly, a threaded rod 34, which is fixed in both the rotational and the axial senses to the shaft 31 of the electric motor 11, being for example integral with the said shaft 31, and secondly, a threaded sleeve which is in threaded engagement with the threaded rod 34, and which constitutes the member 16 on which the resilient assisting means 15 act, as will be explained later herein.

In order to avoid any clearance between itself and the threaded rod 34, this threaded sleeve is, in the present case, open longitudinally via one or more slots 35, and, over at least part of its length, it is surrounded by an external torsion spring 36 which is under precompression.

According to the invention, the mechanical compensating means 17 comprise at least one train of rollers 37, which are mounted for rotation about an axis A2, this axis being fixed with respect to the casing 20 and orthogonal to the axis A1 of the hydraulic actuator 14, and which comprise, spaced away from the said fixed axis A2, at least two rollers 38A, 38B, namely a first roller 38A in contact with a first plate 39A which, being coupled for movement with the member 16 of the transmission 12, is movable axially between two positions, one of which is a retracted position, FIGS. 1 and 4, the other being a deployed position, FIG. 6, and a second roller 38B which is in contact with a second plate 39B on which the resilient assisting means 15 bear, and which, while being mounted in rotation on the first plate 39A, is mounted for axial movement with respect to the latter.

In this example the fixed axis A2 is defined by a spindle 49 which is mounted for rotation in the body 21 of the casing 20.

The two plates 39A, 39B extend transversely with respect to the axis A1 of the hydraulic actuator 14, coaxially with the latter.

The first plate 39A lies on the same side as the base portion 26 of the body 21 of the casing 20, and the second plate 39B lies on the same side as the cover plate 22 of the said casing 20.

In this example, the first plate 39A constitutes a collar portion at the end of a pot member 40, and the threaded sleeve constituting the member 16 of the transmission 12 is abutted, through a collar portion 41, on the base portion 42 of this pot member 40, being fixed to this base portion 42 by means of screws 43.

The first plate 39A is thus fixed, in both the axial and rotational senses, to the member 16 of the transmission 12.

For guiding the second plate 39B in axial movement and driving it in rotation, a splined coupling 44 is provided between the latter and the rider assembly constituted by the pot member 40 and the threaded sleeve which constitutes the member 16 of the transmission 12.

The pot member 40 has an internal diameter which is slightly greater than the outside diameter of the body 27 of the hydraulic actuator 14, and it is engaged on the latter in its mouth.

Thus, if desired, and as is shown in FIGS. 1 to 6 with a small fitting clearance, the body 27 of the hydraulic actuator 14 may define an external cylindrical guide surface 45 for the first plate 39A.

Projecting from the base portion 42 of the pot member 40 is an axial projecting element 46 by which the member 16 of the transmission 12, and therefore the electric motor 11, act on the piston 13 of the hydraulic actuator 14.

In this example, the projecting element 46 has a blind internal bore 47 for receiving the threaded rod 34, to the advantage of the axial compactness of the assembly as a whole.

In this example the surfaces by means of which the projecting element 46 and the piston 13 of the hydraulic actuator 14 bear axially on each other are spherical, so as to compensate for any obliqueness between the axis A3 of the electric motor 11 and the axis A1 of the hydraulic actuator 14.

In the present case the resilient assisting means 15 comprise a spring 48 of the coil spring type, which is coaxial with the hydraulic actuator 14. This spring 48 extends around the threaded sleeve which constitutes the member 16 of the transmission 12.

It is engaged on the cover plate 22 of the casing 20, and bears on the second plate 39B of the mechanical compensating means 17.

In this example the mechanical compensating means 17 has two trains of rollers 37, which are disposed in diametrically opposed positions with respect to each other on either side of the axis A1 of the hydraulic actuator 14, being symmetrical with each other with respect to the said axis A1, and they each work between the two plates 39A, 39B.

In this example the two rollers 38A, 38B of each of these trains of rollers 37 are mounted for rotation between two side plates 50, about axes which are parallel to the corresponding fixed axis A2, and they lie in a common diametral plane with respect to the hydraulic actuator 14.

The two rollers 38A, 38B are located in a triangular formation with the fixed axis A2.

In the retracted position of the first plate 39A, FIGS. 1 and 4, the roller 38B that makes contact with the second plate 39B is aligned with the fixed axis A2 parallel to the axis A1 of the hydraulic actuator 14.

In this example, each of the trains of rollers 37 includes an oblique ramp 51 which is spaced away from its fixed axis A2 and which is interposed on the path of the first plate 39A between its retracted and deployed positions.

In the retracted position, FIGS. 1 and 4, the first plate 39A bears on this ramp 51 through a spring 52, which in the present case is a leaf spring and which, to this end, is under precompression. In the present case the spring 52 is attached by means of rivets 53 on the first plate 39A, on the side of the latter opposite to the second plate 39B.

At its free end it is formed with a beak 54, by means of which it is able to fit into the first plate 39A by virtue of a rebate 55 which is provided for this purpose on the peripheral edge of the latter.

In this example, the ramp 51 of each train of rollers 37 is defined by the edge of the side plates 50 of the latter, and it is part of a nose portion 56 which is formed on these side plates 50 on the side having the fixed axis A2.

In this example the base portion 26 of the body 21 of the casing 20 carries on its internal surface an annular ring 57 of resilient material, extending around the body 27 of the hydraulic actuator 14 so as to constitute an end stop element for the first plate 29A when the latter is in its deployed position, FIG. 6.

In the present case the piston 13 of the hydraulic actuator 14 is acted on by a return spring 58 which bears on the blind base portion of the body 27 of the hydraulic actuator 14, and which biasses it permanently towards the projecting element 46 of the mechanical sub-assembly 10A.

However, in order to retain the piston 13 in position in the absence of the mechanical sub-assembly 10A, prior to the assembly of the latter with the hydraulic sub-assembly 10B, a resilient split ring 59 is arranged at the mouth of the body 27 of the hydraulic actuator 14.

The body 27 of the hydraulic actuator 14 is connected through a port 60 with a pipe 61 for connecting it to the clutch which is to be controlled.

In this example the hydraulic actuator 14, and more precisely the body 27 of the latter, is also under the control of an electromechanical valve 63 which, when it is under an applied voltage, that is to say when it is energised electrically, is closed.

As regards the control of a clutch, and assuming that the latter is engaged, the member 16 of the transmission 12 is initially in its retracted position as shown in FIGS. 1 and 4.

The same is true of the first plate 39A of the mechanical compensating means 17, and therefore of the second plate 39B of the latter.

Under the biassing effect of its return spring 58, the piston 13 of the hydraulic actuator 14 is also in its retracted position, in abutment against the projecting element 46 of the mechanical sub-assembly 10A.

The pressure in the body 27 of the hydraulic actuator 14 is then relatively low. As has been mentioned above, the trains of rollers 37 are hooked by means of their nose portions 56 on the first plate 39A of the mechanical compensating means 17, and their roller 38B lies radially level with the fixed axis A2.

Let $R_B$ be the radius of the assembly on which the roller 38B then lies with respect to the axis A1 of the hydraulic actuator 14.

The roller 38A of the trains of rollers 37 lies at the same time on a radius $R_A$ smaller than the radius $R_B$ mentioned above.

Through, in succession, the second plate 39B, the trains of rollers 37, the first plate 39A and the pot member 40, a reaction force is applied to the spring 48 constituting the resilient assisting means 15 by the threaded sleeve which constitutes the member 16 of the transmission 12, this threaded sleeve being duly positioned by the threaded rod 34 and maintained in its axial position by the latter, under the control of the electric motor 11.

The spring 48 is then serving no practical purpose.

In controlling the disengagement of the clutch, the electric motor 11, being appropriately supplied with power, causes the member 16 of the transmission 12 to be displaced by screw thread action from its retracted position shown in FIGS. 1 and 4 to its deployed position shown in FIG. 6.

Through the interposed second plate 39B, the trains of rollers 37, the first plate 39A, and the pot member 40, the spring 48 of the resilient assisting means 15 accompanies the member 16 of the transmission 12 in its axial displacement, and at the same time it subjects the latter to an axial assisting force F' which, in parallel with the axial force developed jointly by the electric motor 11 through the transmission 12, causes the piston 13 of the hydraulic actuator 14 to undergo a simultaneous axial displacement, and therefore also causes the pressure within the body 27 of the hydraulic actuator 14 to be raised.

However, because of the mechanical compensating means 17, this axial assisting force F' is in the following relationship with the axial force F which is actually developed by the spring 48, having regard to the multiplying coefficient due to the radial offset between the rollers 38B, 38A of the trains of rollers 37 of the said mechanical compensating means 17:

$$F' = F \times \frac{R_A}{R_B}$$

From the start of the axial displacement of the first plate 39A, and due to the action of this first plate 39A on the ramp 51, reinforced by the spring 52, the trains of rollers 37 are caused to pivot about their fixed axis A2, as is indicated diagrammatically by an arrow F1 for one of them in FIG. 4, which leads the roller 38B of the trains of rollers 37 to move closer to the axis A1 of the hydraulic actuator 14, this being balanced by a simultaneous relative axial increase in the spacing between the second plate 38B and the first plate 39A.

Thus the radius $R_B$ is reduced, while the radius $R_A$ remains substantially constant.

Figure 7:
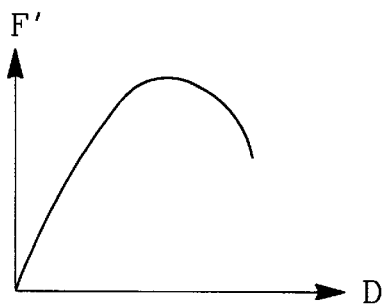
FIG. 7 is a diagram illustrating the effects of the mechanical compensating means employed in the control device in accordance with the invention.

Then, and as is indicated by the diagram of FIG. 7, on which the axial displacement D of the member 16 of the transmission 12 is indicated on the abscissa, with the axial assisting force F', developed by the spring 48 at the level of the said member 16, being shown on the ordinate, the curve representing this axial assisting force F', which initially increases, passes through a maximum that corresponds to an alignment of the rollers 38A, 38B of the trains of rollers 37 parallel to the axis A1 of the hydraulic actuator 14, as is shown for one of these trains of rollers 37 in FIG. 5, before then decreasing.

This representative curve thus has the same shape as the characteristic curve of a clutch diaphragm, and this enables the pressure in the body 27 of the hydraulic actuator 14 to be best matched, at any instant, to such a diaphragm.

During an operation of controlling the reengagement of the clutch, the electric motor 11, which is therefore supplied appropriately with electrical power, returns the member 16 of the transmission 12 into its initial retracted position, which causes the piston 13 of the hydraulic actuator 14 to retract at the same time. In the event of any fault, reengagement of the clutch is always possible; in this connection, the electromechanical valve 63 opens since it is then no longer energised electrically.

The electromechanical valve 63 also enables wear to be taken up, by providing a corresponding supply to the hydraulic actuator 14.

Figure 8:
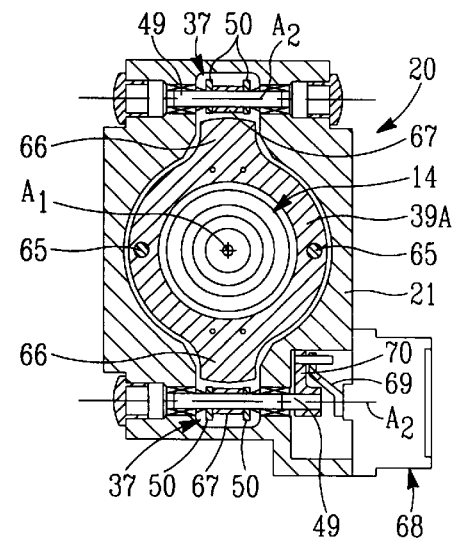
FIG. 8 is a view in transverse cross section of a modified embodiment of the control device in accordance with the invention.

In the modified embodiment in FIG. 8, the first plate 39A is guided by means of bars 65, which are appropriately provided for this purpose parallel to the axis A1 of the hydraulic actuator 14, and which are fixed to the body 21 of the casing 20.

In this variant, the first plate 39A has arms 66 for cooperation with the trains of rollers 37, and a spacing sleeve 67 is arranged between the side plates 50 of these latter.

Finally, in this version, one of the trains of rollers 37 controls a potentiometer 68 which is attached on the outside of the body 21 of the casing 20, so as to enable position marking to be provided. In this example, the cursor, which is not shown in the Figure, of this potentiometer 68 is mounted through an arm 69 on an arm 70, which is itself mounted on the shaft 49 defining the fixed axis A2 of the train of rollers 37 concerned, this shaft being made long enough for this purpose.

Apart from their guiding function, the bars 65 also prevent rotation of the first plate 39A.

Other means may be envisaged for preventing this rotation.

For example, a coupling may be provided for this purpose between the first plate 39A and the body 21 of the casing 20, such as for example a coupling by means of tongues, or a tenon and mortice coupling.

A splined coupling with the body 27 of the hydraulic actuator 14 may also be provided.

The present invention is, in addition, not limited to the embodiments described and shown, but embraces all practical variations and/or combinations of their various elements.

I claim:

1. A control device comprising a hydraulic actuator (14) having a piston (13), a body (27) and an axis (A1), an electric motor (11), which, through a transmission (12) having members, acts on the piston (13) of a hydraulic actuator (14) constituting an output element for the assembly, resilient assisting means (15), which act in parallel with the electric motor (11) on a first member (16) of said transmission (12), and mechanical compensating means (17) which provide controlled modulation of the action of said resilient assisting means (15) on said first member (16), wherein the said mechanical compensating means (17) include at least one train of rollers (37), which are mounted for rotation about a fixed axis (A2) orthogonal to the axis (A1) of the hydraulic actuator (14) and which comprise, spaced away from said fixed axis (A2), at least two rollers (38A, 38B), namely a first roller (38A) making contact with a first plate (39A), which is coupled to the first member (16) of the transmission (12) for movement therewith and which is movable axially between two positions, one retracted and one deployed, and a second roller (388) making contact with a second plate (39B), on which the resilient assisting means (15) bear, and which, while being rotatable with the first plate (39A), is mounted for axial movement with respect to the latter.

2. A control device according to claim 1, wherein the train of rollers (37) includes an oblique ramp (51) which is spaced away from a fixed axis (A2).

3. A control device according to claim 2, wherein, in the retracted position, the first plate (39A) bears on the ramp (51) of the train of rollers (37) through a precompressed spring (52).

4. A control device according to claim 2, wherein, in the retracted position of the first plate (39A), the roller (38B) which makes contact with the second plate (39B) is aligned with the fixed axis (A2) parallel to the axis (A1) of the hydraulic actuator (14).

5. A control device according to claim 2, wherein the shaft (31) of the electric motor (11) extends along an axis (A1) of the hydraulic actuator (14).

6. A control device according to claim 5, wherein the transmission (12) includes two members in screw-and-nut relationship with respect to each other, wherein a threaded rod (34) which is fixed to the shaft (31) of the electric motor (11), and a threaded sleeve which constitutes the first member (16), being in screw-threaded relationship with the threaded rod (34).

7. A control device according to claim 6, wherein the resilient assisting means (15) comprise a spring (48) of the coil spring type, coaxial with the hydraulic actuator (14).

8. A control device according to claim 7, wherein the spring (48) of the resilient assisting means (15) extends around the threaded sleeve constituting the first member (16) of the transmission (12).

9. A control device according to claim 1, wherein said device comprises, separately from each other, firstly a mechanical sub-assembly (10A), which comprises the electric motor the transmission (12), the resilient assisting means (15) and the mechanical compensating means 117), and secondly, a hydraulic sub-assembly (10B) which is attached on the mechanical sub-assembly (10A) and which comprises the hydraulic actuator (14).

10. A control device according to claim 9, wherein the body (27) of the hydraulic actuator (14) is at least partly engaged axially in the mechanical sub-assembly (10A).

11. A control device according to claim 1, wherein one of the trains of rollers (37) controls a potentiometer (68).

12. A control device according to claim 1, wherein the hydraulic actuator (14) is under the control of an electromechanical valve (63) which is closed when energised electrically.

* * * * *